Figure 1:
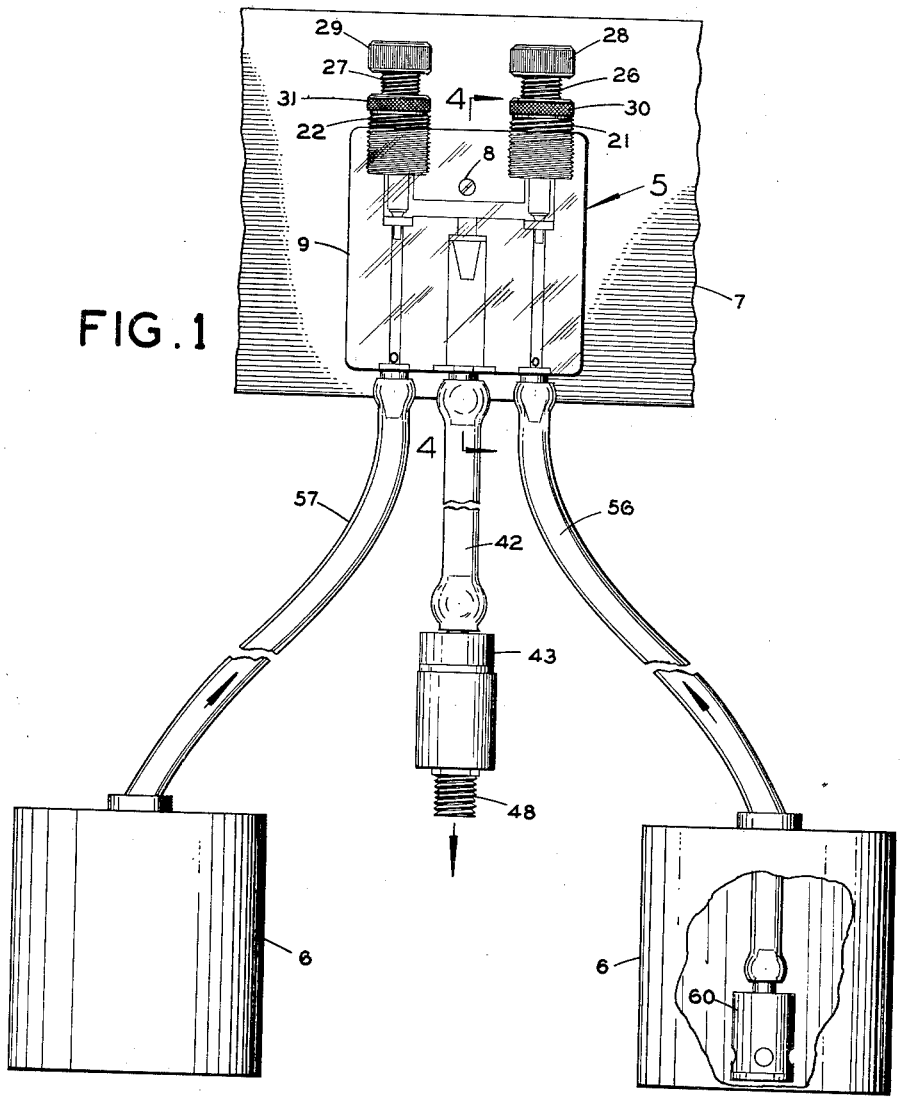

June 12, 1962  C. J. FORTIN  3,038,495
WATER TREATMENT DEVICE

Filed June 24, 1959  2 Sheets-Sheet 1

INVENTOR.
CONRAD J. FORTIN
BY
ATTORNEY

June 12, 1962

C. J. FORTIN 3,038,495

WATER TREATMENT DEVICE

Filed June 24, 1959

2 Sheets-Sheet 2

INVENTOR.
CONRAD J. FORTIN
BY

ATTORNEY

United States Patent Office 3,038,495
Patented June 12, 1962

3,038,495
WATER TREATMENT DEVICE
Conrad J. Fortin, Miami, Fla., assignor to Watco, Inc., Miami, Fla., a corporation of Florida
Filed June 24, 1959, Ser. No. 822,585
2 Claims. (Cl. 137—559)

This invention relates to apparatus and methods for treating fluids, and more particularly to methods and apparatus for chemically treating water.

The water supplies of certain communities, and particularly the water supply in some of the Southern States are generally unfit for human consumption and many industrial uses. These water supplies contain large amounts of objectionable minerals, possess a disagreeable odor and taste, and have in certain instances a high bacteria and algae content. These undesirable characteristics generally make the water supply obnoxious and unpalatable, and in certain instances actually injurious for human consumption.

These characteristics of the water supply make it desirable, and in some cases necessary, to treat the water before use. The problem of treating water supplies of the type described above has been particularly difficult heretofore in those instances in which the water supply is relatively small. More specifically, the cost of an installation to adequately treat such water supplies has been prohibitive unless the volume of water treated was relatively large.

It has been found that water of the character described above may be treated by mixing certain chemicals with the water and when desirable and necessary, filtering the water so treated, to remove any materials which precipitate. The present invention contemplates adding chemicals for treating the water at or near the pump which collects the water and places it under pressure. The system for introducing the chemicals into the water must provide means for regulating the rate at which the chemicals are added to the water, and must be so constructed as to protect the pump and pump motor under all conditions of operation.

Accordingly, it is an important object of the present invention to provide an improved apparatus and method for treating fluids; more particularly, it is an object of the invention to provide an improved apparatus and method of treating water.

Another object of the invention is to provide apparatus of the type described, which includes simple and effective means for introducing the chemicals into the water and improved means for adjusting the rate at which the chemical treating solutions are introduced into the water.

Yet another object of the invention is to provide a water treating apparatus which will not cause injury to the pump and pump motor under all conditions of operation.

A further object of the invention is to provide a water treating apparatus which is simple in construction and which may be readily cleaned.

A still further object of the invention is to provide in water treating apparatus of the type described means for simultaneously and independently introducing a plurality of water treating chemicals into the water being treated.

Figure 2:
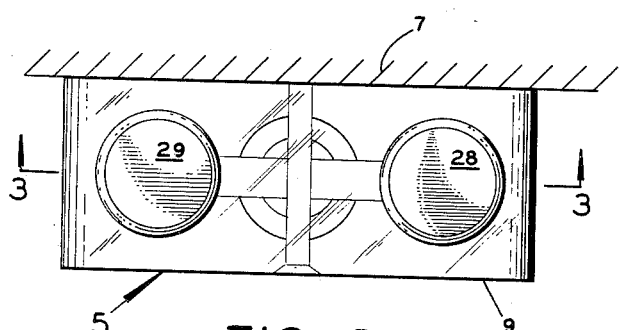
Figures 3, 4:
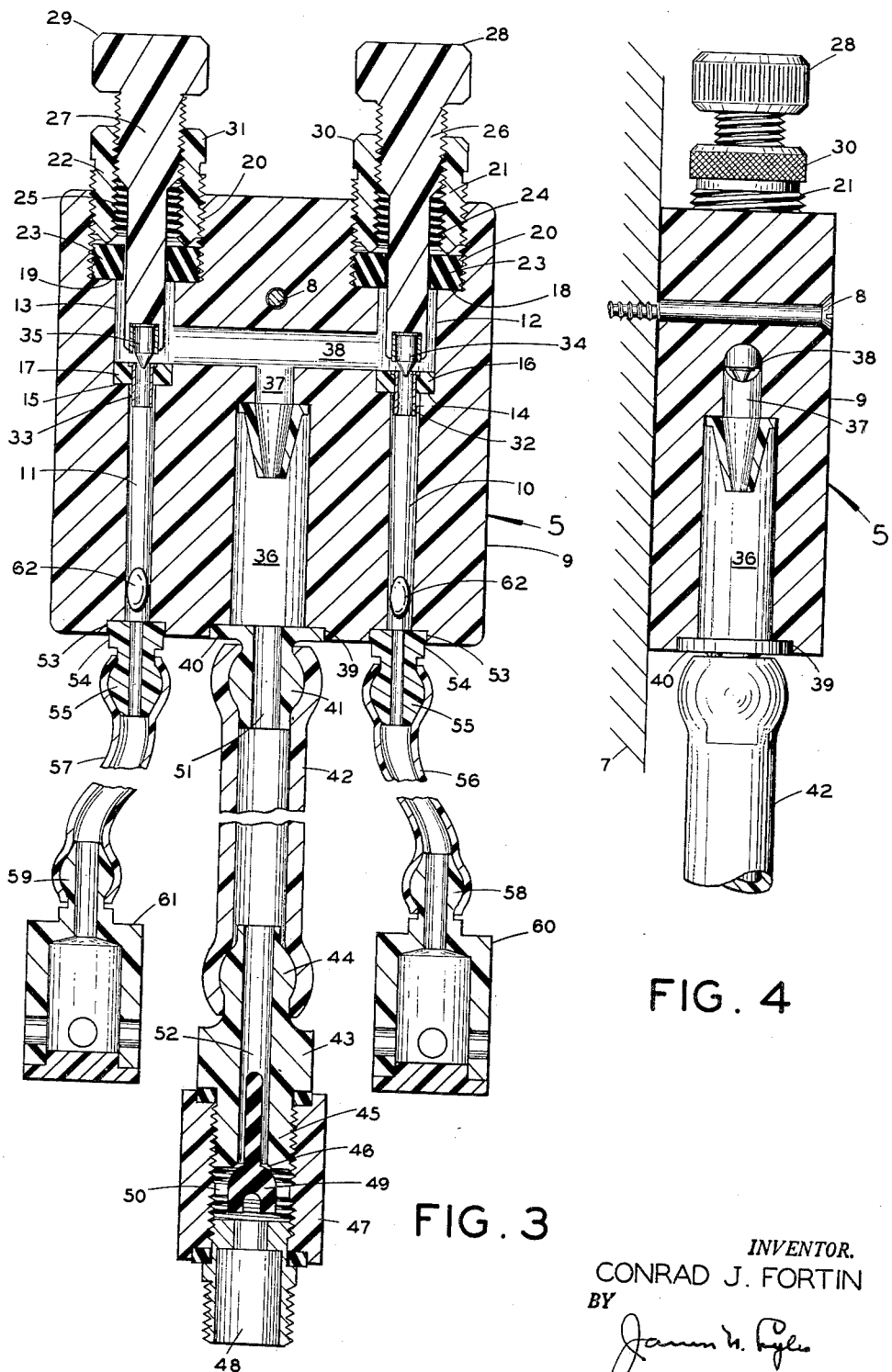

These and other objects of the invention will be better understood upon perusal of the following specifications when taken in conjunction with the accompanying drawings, wherein:

FIGURE 1 is a side elevation of a mixing and regulating unit in assembled relation with respect to a water suction line and receptacles for water treatment chemicals, FIGURE 2 is a top plan view of the mixing and regulating unit, FIGURE 3 is a vertical section taken on line 3—3 of FIGURE 2 and, FIGURE 4 is a central vertical section taken on line 4—4 of FIGURE 1 and at a right angle to the illustration of FIGURE 3.

Referring specifically to the drawings and particularly to FIGURE 1, there has been illustrated a mixing and regulating unit, illustrated as a whole by the numeral 5. The unit 5 is formed of a suitable plastic known commercially as Plexiglas. The numeral 6 indicates a pair of receptacles, formed of any desirable material and in which is disposed the chemicals that are to be mixed with the water. The unit 5 is adapted to be mounted upon a suitable wall panel 7, by a screw 8, while the receptacles 6 are supported upon a suitable platform or upon the floor adjacent to the unit 5.

The unit 5 embodies a block of plastic 9 that is vertically bored upwardly from its bottom to form ports 10 and 11. The ports 10 and 11 are spaced apart as indicated and are parallel with each other. The ports 10 and 11 are enlarged at their upper ends as indicated at 12 and 13, forming shoulders 14 and 15 for the seating reception of valve seats 16 and 17, fixed within the bottoms of the enlarged ports 12 and 13. The block 9 upon its top side is cylindrically recessed, concentric to the ports 12 and 13, forming shoulders 18 and 19. The recesses are internally threaded at 20 for the reception of packing glands 21 and 22. The glands 21 and 22 bear against a compressible seal ring 23, that is seated upon the shoulders 18 and 19. The glands 21 and 22 are further axially bored and threaded at 24 and 25, for the threaded reception of needle valves 26 and 27. The needle valves 26 and 27 are provided with enlarged knurled heads 28 and 29, while the glands 21 and 22 are provided with knurled heads 30 and 31. The glands 21 and 22 and the needle valves 26 and 27 are also formed of Plexiglas.

The valve seats 16 and 17 are also formed of Plexiglas and are provided with axial openings for receiving metallic tubular inserts 32 and 33, while the stem portion of the needle valves at their lower ends are provided with metallic inserts 34 and 35 that have adjustable seating engagement with the inserts 32 and 33. The inserts 32, 33, 34 and 35 are suitably sealed with respect to the seats 16 and 17 and the needle valves 26 and 27 by any suitable bonding compound. The inserts 32, 33, 34 and 35 are formed of a relatively non-corrosive material, such as stainless steel. The glands 21 and 22 compress the seals 23, forcing the seals to a fluid tight engagement with the valve stems 26 and 27 throughout their movement.

The block 9 is further provided with a relatively large vertical bore 36 centrally thereof and equidistantly spaced from the bores 10 and 11. The bore 36 communicates through a reduced bore 37 with a horizontal port 38. The port 38 communicates with the bores 12 and 13. The block 9, concentric to the bore 36 is provided with an enlarged recess 39, to receive a flange 40, formed upon a semi-spherical head 41. The flange 40 and the head 41 are likewise formed of Plexiglas. Connected with the head 41 is a flexible Plexiglas tube 42. The tube 42 is of any desirable length and at its opposite end is connected with a Plexiglas coupling member 43, having a semi-spherical head 44. The coupling 43 at its opposite end is provided with a threaded cylindrical extension 45, having a valve seat 46. The extension 45 is threadedly engaged with an internally threaded Plexiglas sleeve 47, and the sleeve 47 at its lower end is connected with a metallic threaded coupling 48 that is connected to the suction side of a conventional water pump (not shown).

A floating valve 49 is disposed within a valve chamber 50, formed by the coupling 48 and the extension 45, to have a vertical seating movement against the seat 46, should there be a reverse flow of the water supply. The head 41 and the coupling member 43 are vertically ported at 51 and 52, whereby to establish a continuous flow of chemicals through the ports 10 and 11, the ports 38 and 36 and the pipe 42 to be injected or mixed into the water being pumped by the pump.

The block 9 upon its bottom side is concentrically recessed with respect to the ports 10 and 11, as indicated at 53, to receive flanges 54, carried by semi-spherical heads 55. The heads 55 are also ported and communicate with the bores 10 and 11. The heads 55 receive flexible plastic Plexiglas tubes 56 and 57. The tubes 56 and 57 may be of any desirable length and at their lower ends are connected with semi-spherical heads 58 and 59, carried by strainer elements 60 and 61, that are disposed within the containers 6. Elements of the strainers have been omitted for purpose of clearness, since strainer elements are well known in the art. The strainers 60 and 61, together with the heads 55, 58 and 59 are also formed of Plexiglas, forming a material that is highly resistant to corrosion. Disposed within the ports 10 and 11 are indicator floats 62 that rise and fall under the influence of the chemicals being siphoned from the containers 6 and whereby to indicate to the operator the degree of flow of the chemicals, since the entire mechanism, including the floats may be viewed through the relatively transparent Plexiglas block 9. The floats 62 are of suitable material and of suitable weight and diameter so that the flow of the chemical upwardly through the ports 10 and 11 may readily be observed. The floats and the material of the floats will obviously be varied in accordance with the specific gravities of chemicals employed. The floats 62 also function as check valves against the entry of air to the mixing chamber and subsequently to the pump line and that would normally destroy the prime of the pump. When either or both chemicals have been exhausted from the containers 6, a continued suction upon the conduit 42 would normally cause air to flow through the strainer devices and downwardly to the pump. When this occurs, the relatively large volume of air suction created in the mixing chamber, pulls the float devices upwardly to engage the inserts of the valve seats, thus effectively preventing the drawing of air into the pump line.

In the use of the device, the block 9 is mounted securely upon the suitable panel or wall area. After the mounting of the block 9, connection is made with the suction side of the pump by suitable conduits. The strainers 60 and 61 are then inserted into the container 6 to rest upon the bottoms of the containers and, with the pump in operation, suction will be created through the pipe 42, the bore 36, the transverse bore 38 to the bores 10 and 11, causing a suction action through the strainers 60 and 61, and creating a flow of the chemicals upwardly through the ports 10 and 11 and through the port 38, to the port 36 to be discharged downwardly through the pipe 42 to be mixed with the water being pumped. The operator will observe the position of the floats 62 and adjust the needle valves 26 and 27 to control the flow of the chemicals through the system. The flow of the chemicals are naturally determined in accordance with the condition of the water to be treated.

It will be apparent from the foregoing that a very novel form of mixing and regulating unit has been provided. The forming of the unit 5 of Plexiglas or similar clear plastics permits the operator to observe the movement of the several elements embodied in the construction and permits the operator to observe the flow of the chemicals to be mixed with the water supply. The forming of the several elements of plastic, provides a very desirable construction from the standpoint of corrosion and the use of plastics greatly retards the accumulation of film or sediment in the several ports that would interfere with the proper flow of the chemicals. The packing glands and the needle valves, as formed from plastic readily lend themselves to machining to form the co-acting threads. In the event that there is a backflow of water from the pump line, the check valve 49 will promptly seat against upward pressure, preventing any flow of water through the system that might tend to dilute the chemicals in the container 6. The connections for the heads 41 and 55, for purpose of simplicity, requires only that the flange 54 be cemented within the recesses 53 by a bonding plastic cement that effectively makes these elements substantially integral. Such is also the case with the flange 40 of the head 41. The parts are few and simple, are clearly visible to the operator and easily and accurately adjusted to control a predetermined flow of the chemicals under the suction influence of the water being pumped. The device is relatively cheap to manufacture, is strong, durable and most effective as a mixing and regulating unit for water systems wherein chemicals are to be injected into the water to clarify and overcome bacteria or the like that is normally present to some degree in most water systems where a well is provided for the source of water supply. The device is such that it may be sold as a unitary structure for installation in any water supply system, also including those types of water system that are municipally controlled and where certain undesirable quality of water is furnished.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. A water treating apparatus of the character described that comprises a mixing device formed of a block of transparent plastics, a mixing chamber formed in the block, a flexible conduit connected with a lower end of the chamber and that has connection with a source of water supply, a pair of ports formed in the block in spaced apart relation to the mixing chamber and that are provided at their upper ends with a valve seat, the lower ends of the ports having connection with flexible conduits that extend into chemical containers, the last named conduits at their lower ends being provided with strainer devices that are disposed within the containers, a connecting port formed in the block that has communication with the first named ports above the valve seats, the last named port also having communication with the mixing chamber, threaded recesses formed in the block coaxial to the first named ports, packing glands threaded into the recesses, each of the glands being bored and threaded for the reception of needle valves, packing means disposed in each of the bottom of the recesses and that are compressible under the influence of the packing glands and whereby to form a fluid tight joint with the needle valves, float devices disposed in the first named ports and that rise and fall under the influence of chemicals passing through the ports, the said float devices being visible through the transparent body member, the said float devices also adapted to engage the valve seats under the influence of a suction action created by the water supply when a chemical has become exhausted in the container and whereby to prevent the passage of said into the mixing chamber, a check device in the first named conduit that prevents a reverse flow of water to the chemical containers, coupling devices that are fixed with respect to the mixing chamber and the first named ports, the said first named conduit being connected to a coupling device at its lower end and with the coupling device being provided with a valve seat, the said valve means for the first named conduit being formed of resilient material and being upwardly seating by a reverse flow of water, the said strainer device being provided with coupling heads for the reception of the lower end of the second named conduits.

2. A water treating apparatus of the character described that embodies a mixing device for chemicals to be injected into a water system, the mixing device embodying a rectangular block of transparent plastics material, the block being centrally and vertically bored to form a mixing chamber, a coupling device fixed coaxial to the lower end of the chamber for receiving a flexible conduit, the conduit at its lower end being connected with a coupling device that is axially ported to communicate with the conduit, the first named coupling device being ported to communicate with the mixing chamber, the second named coupling device at its lower end being provided with a valve seat, a valve device having a stem portion that engages into the bore of the second named coupling device and that is upwardly seated under the influence of a reverse flow of water from the water system, the second named coupling device at its lower end being threaded for connection with a coupling device that is connected to the water system upon a suction side and whereby to create suction through the conduit and the coupling devices to the mixing chamber, the said block being also vertically bored to form ports that are parallel with and spaced apart from the mixing chamber, ported coupling devices fixed with the block coaxial to the ports, flexible conduits connected with the last named coupling devices and that extend downwardly to terminate in chemical containers, the said last named conduits at their lower ends also being connected to coupling heads formed upon strainer elements, the block being also provided with a transverse port that communicates with the mixing chamber and the first named ports, valve seats disposed at the upper ends of the first named ports and below the transverse port, needle valves for controlling the flow of chemicals through the first named ports and to the mixing chamber through the transverse port, the needle valves having head portions and a threaded portion that has threaded engagement within packing glands, the said glands being threadedly engaged into threaded recesses formed in the upper end of the block coaxial to the first named ports, packing means disposed in the bottoms of the recesses and that are compressible against the stems of the needle valves, the stems of the needle valves at their lower ends being provided with metallic inserts and the valve seats being provided with tubular metallic inserts and with the last named inserts extending into the first named ports, float devices in each of the first named ports and that are shiftable in the ports under the influence of chemicals being drawn therethrough under the influence of suction, the said floats adapted to engage the lower end of the tubular inserts when a chemical has been exhausted and whereby to prevent the suction of air through the device, the said flow devices being visible through the transparent body.

References Cited in the file of this patent

UNITED STATES PATENTS

| | | |
|---|---|---|
| 913,516 | Lake | Feb. 23, 1909 |
| 2,272,896 | Pidgeon | Feb. 10, 1942 |
| 2,355,736 | Klein | Aug. 15, 1944 |
| 2,376,565 | Williams | May 22, 1945 |
| 2,672,051 | Butler | Mar. 16, 1954 |
| 2,710,020 | Manville | June 7, 1955 |
| 2,731,830 | Eichenberger | Jan. 24, 1956 |
| 2,830,618 | Mitchell | Apr. 15, 1958 |
| 2,867,213 | Thomas | Jan. 6, 1959 |
| 2,876,988 | Mornard | Mar. 10, 1959 |
| 2,949,130 | Knight | Aug. 16, 1960 |
| 2,957,494 | Stenberg | Oct. 25, 1960 |

FOREIGN PATENTS

| | | |
|---|---|---|
| 545,449 | Italy | July 2, 1956 |